Dec. 27, 1949 A. WILD 2,492,774
PORTABLE ELECTRIC HEATER
Filed Nov. 14, 1945 2 Sheets-Sheet 1

INVENTOR.
ALFRED WILD
BY John W. Michael
ATTORNEY.

Dec. 27, 1949   A. WILD   2,492,774
PORTABLE ELECTRIC HEATER
Filed Nov. 14, 1945   2 Sheets-Sheet 2
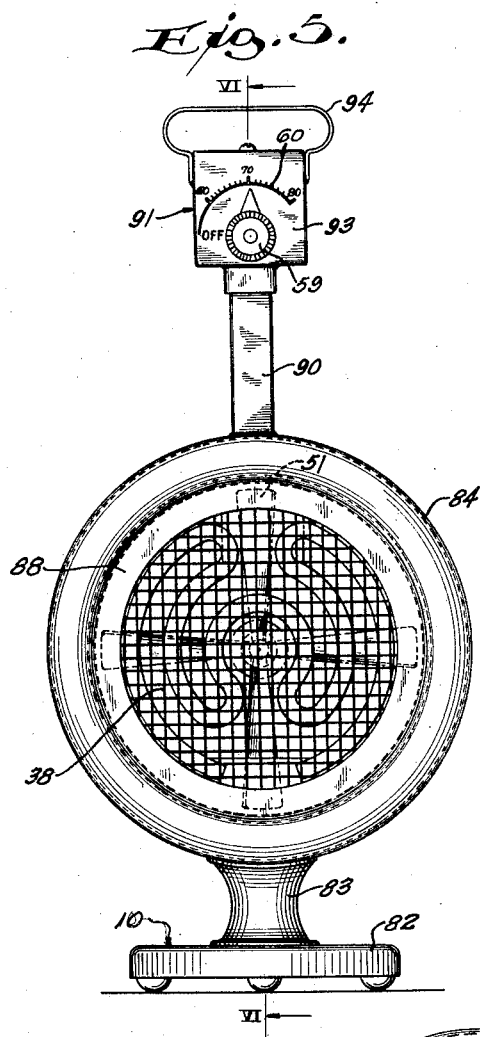
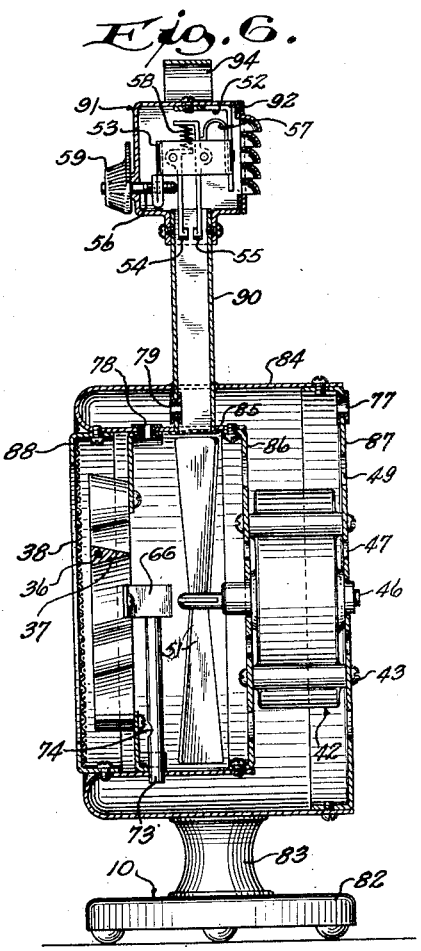
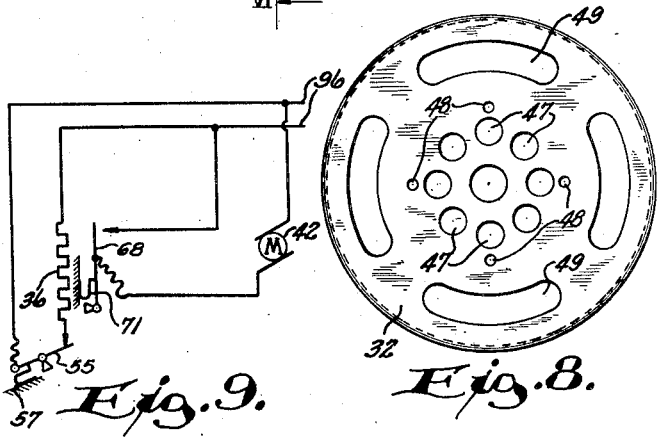
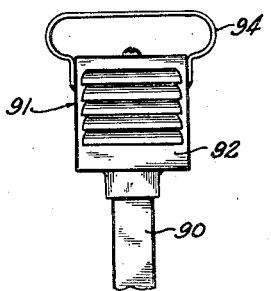
INVENTOR.
ALFRED WILD
BY John W. Michael
ATTORNEY Patented Dec. 27, 1949

2,492,774

UNITED STATES PATENT OFFICE 2,492,774

PORTABLE ELECTRIC HEATER

Alfred Wild, Milwaukee, Wis.

Application November 14, 1945, Serial No. 628,440

15 Claims. (Cl. 219—39)

This invention relates to improvements in electric heaters of the type provided with a fan for forcing air through the heating element.

It is one object of the present invention to provide an electric heater of the fan type in which energization of the heating element is controlled by a thermostat.

Another object of the invention is to provide a portable electric heater of the fan type in which a thermostat controlling energization of the heating element is so mounted as to be responsive to the room temperature and to be substantially unaffected by operation of the heating element.

Another object of the invention is to provide an electric heater of the fan type in which thermostatic control of the heating element is dependent on continued operation of the fan.

Another object of the invention is to provide an electric heater of the fan type in which the fan operating motor is located closely adjacent to the heating element but is effectively cooled by the flow of air drawn into the heater by the fan.

A further object of the invention is to provide an electric heater of the fan type in which the operation of the fan motor is thermostatically controlled dependent on the temperature of the heating element.

A further object of the invention is to provide a fan type electric heater in which the fan motor lags behind both energization and deenergization of the heating element.

A further object of the invention is to provide a portable electric heater of the fan type in which both the heating element and the fan motor are independently thermostatically controlled, the heating element control thermostat being variable at will to maintain the desired room temperature and the motor control thermostat being set to operate only above a given limit of the temperature of the heating element.

And a further object of the invention is to provide an electric heater of the fan type in which both the heating element and the fan motor are independently thermostatically controlled responsive to given temperatures and in which all of the elements of the entire device, except for the electric supply conductors, are combined into a single, readily portable unit with all mechanisms, excepting a control knob, suitably enclosed and guarded.

Objects and advantages other than those above set forth will be apparent from the following description when read in connection with the accompanying drawings, in which:

Fig. 5 is a front elevational view of a second embodiment of the present invention;

Fig. 6 is a vertical sectional view taken on the plane VI—VI of Fig. 5;

Fig. 7 is a rear elevational view of a fragment of the structure shown in Figs. 5 and 6;

Fig. 8 is an elevation of one of the elements common to both embodiments of the invention; and Fig. 9 is a diagram of the electrical connection of the heating element and of the fan motor in both the embodiments of the invention.

Generally, the structure embodying the present invention includes a base or pedestal to bring the device a suitable distance above the floor level, and for other purposes. A casing preferably comprising an outer and inner casing, is mounted in spaced relation on the base and has one end substantially enclosed to provide a mounting for a motor-operated fan. The side walls of the two casings are spaced a suitable distance to provide for heat insulation of the outer casing and to furnish passages for the flow of air. The fan forces the air through a heating element which is sheathed in a form to secure the quickest and the maximum heat transfer therefrom with increased life of the element and is suitably guarded. The operating fan draws air from a location remote from the heating element and causes flow of such air over a first thermostat controlling the circuit of the heating element, such air being drawn by the aspirating effect of the ends of the fan blades passing over the end of a tube in closing or extending from adjacent the thermostat. The heating element control thermostat is therefore actuated responsive to a predeterminable room temperature only. The operation of the fan motor is independent of the heating element and responsive to the temperature thereof, and is controlled by a second thermostat which preferably is set to lag behind both the energization and deenergization of the heating element. Either one or both of the thermostats may be adjusted as desired.

Figure 1:
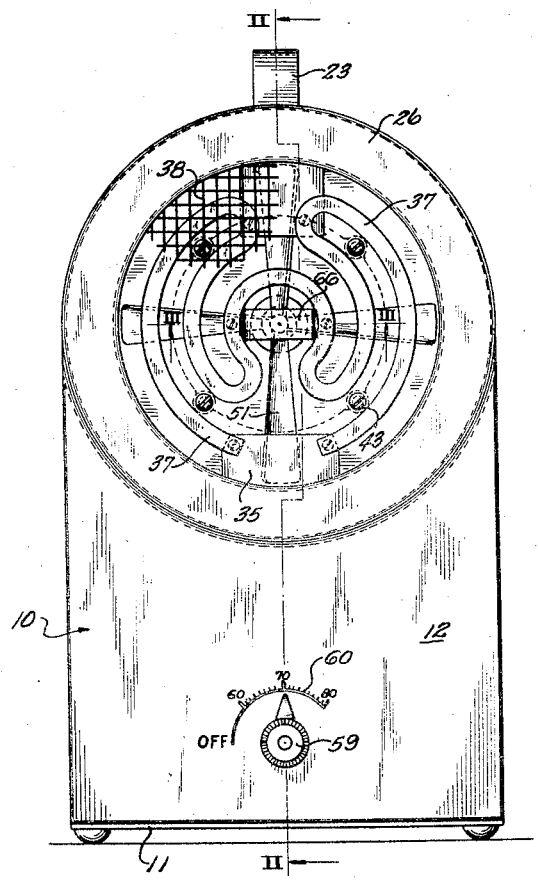
Fig. 1 is a front elevation of a portable fan type electric heater embodying the present invention.
Figure 2:
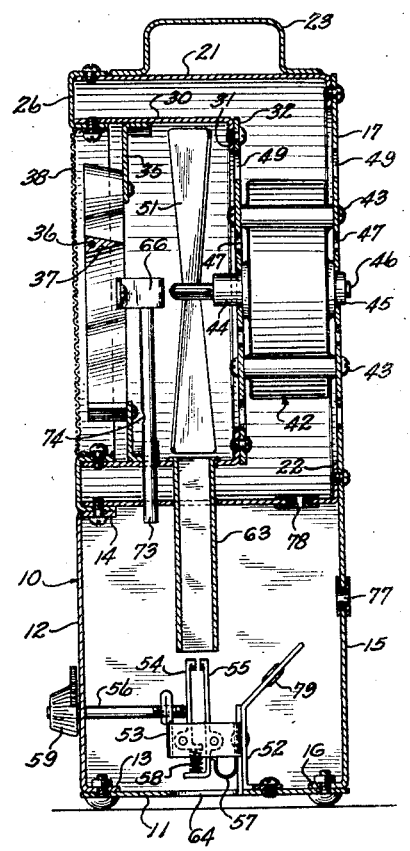
Fig. 2 is a vertical sectional view taken on the plane II—II of Fig. 1.

Referring particularly to the drawings, the reference numeral 10 generally designates a base or pedestal which, in the embodiment shown in Figs. 1 and 2, is formed with a side and bottom piece 11 of substantially U shape with suitable feet. One edge of the bottom piece is closed by a front plate 12 secured thereto as by a flange 13 and having the upper edge thereof flanged, as at 14, to form a seat for other portions of the structure. The other edge of the bottom piece is closed by a back plate 15 also secured as by a flange 16 to the bottom piece and formed at its upper edge either as a counterpart of the front plate 12 or extending upwardly of the front plate as an integral plate with a portion generally designated 17, for a purpose to be described.

A casing is seated on and secured to the base or pedestal and is preferably made either as two separate portions as shown in Figs. 1 and 2 or as a unitary double-walled casing as shown in Figs. 5 and 6, the several portions or walls being spaced to provide air flow passages and conductor conduits and to insulate the exterior casing portion from the inner casing portion as regards either or both electricity and heat. It will be understood by one skilled in the art that modification of the structure to employ only a single casing, may be made while retaining the essential characteristics of the device.

The outer casing portion, generally designated 21, is preferably made in substantially cylindrical shape and is of a diameter to seat on the front plate flange 14 and to be attached by way of a flange 22 to the back plate 15—17. It will be understood that the casing portion 21 is sufficiently strong and rigid to permit transportation of the entire device by means of a handle 23 fixed on the casing. If the back plate 15—17 is made in one piece, as shown in Fig. 2, the portion 17 thereof substantially closes the rear end of the outer casing but it will be understood that such portion may also be made as a separate plate, as disclosed in Figs. 6 and 8.

A channel or U-shaped member 26 is attached to the open or front end of the casing portion 21 preferably to enclose the edge of such casing as shown. Such member is annular or ring-shaped and forms a spacer and support for an inner casing portion 30 which is also of substantially cylindrical shape and of such size as to extend in spaced relation into the outer casing 21. Such inner casing terminates a material distance from the back plate portion 17 and is flanged as at 31 to receive a plate 32 substantially closing the inner end of the inner casing portion.

Brackets 35 are fixed on the inner surface of the inner casing and extend toward each other to support a heating element comprising a high resistance electric conductor 36 enclosed in a refractory and heat conducting sheath 37 which is preferably made substantially triangular in cross section as shown. The heating element as a whole is preferably shaped as shown in Figs. 1 and 5, for the purpose of providing substantially uniform spacing of the several loops of the heating element throughout and substantially uniform heating of the cross-sectional area of the inner casing and to provide adequate passages for the flow of air through the heating element. Formation of the heating element sheath 37 as shown provides a readily manufactured shape giving high heat transfer to the air passing over the heating element with a low resistance to the air flow. However if desired, the heating element may also be given the well-known airfoil shape to secure the maximum heat transfer with the minimum of flow resistance. A screen 38 is mounted in the open end of the inner casing and at a distance from the heating element to prevent contact of persons or clothing with the heating element.

An electric motor 42 is mounted on the casing and preferably in the space between the outer casing plate portion 17 and the inner casing plate 31 as by screws 43 passing through the plates and with the motor bearings 44 and 45 for the motor shaft 46 extending through the several plates. Being intended for space heating purposes for which electric heaters are generally used, the motor will be either A. C. or D. C. and otherwise of the character required by the electric supply system available. It will be seen (see particularly Fig. 8) that the several plates 17 and 31 are provided with a plurality of sets of similar and relatively large apertures 47 spaced relatively closely to and around the motor bearings 44 and 45, the holes for screws 43 being indicated at 48. Similar and relatively large sets of elongated apertures or slots 49 are formed in the casing plates beyond and about the periphery of the motor. A fan 51 is mounted on the end of the shaft 46 extending into the inner casing 30 and is in relatively close proximity to the heating element.

Energization of resistor 36 is controlled by a thermostat shown in Figs. 1 and 2 as mounted in the base 10 on a suitable bracket 52. The thermostat comprises a substantially U-shaped yoke 53 in which are pivotally mounted contact levers 54 and 55, the lever 54 being held in adjusted position by a screw 56 bearing on the lever, and the lever 55 being subjected to a bi-metal 57 which, upon expansion, swings the contact end of lever 55 toward the contact end of lever 54 against the action of a spring 58. The screw 56 extends through the base front plate 12 and is provided with a hand knob 59 having an indicator coacting with a scale 60 on the front plate and indicating the "off" position of the thermostat and various output temperatures to which the thermostat may be adjusted. The thermostat is placed closely adjacent to either a simple opening in the casing or to the end of a tube 63 extending through both the inner and outer casings and with the opening or tube end closely adjacent to the circle defined by the ends of the fan blades. It will be understood that a simple opening is sufficient when the casing is only a single wall but that a tubular connection is desirable between the walls of a double casing such as shown to produce an adequate flow of air over and through the thermostat. The fan 51 and the tube 63 are on a common center line so that rotation of the fan aspirates air through the tube, the air being drawn from about the thermostat and through a hole 64 in the base bottom 11 from closely adjacent the floor on which the heater is usually placed. Such air is the coolest air in the room and is effective in making the thermostat responsive only to room temperature and in avoiding any effect on the thermostat by the radiant energy from the heating element.

The energization of the motor 42 is preferably controlled by a second thermostat closely associated with the heating element 36—37. However, it will be understood that the motor may be controlled by the first thermostat if desired. Such single thermostatic control of both the heating element and the motor then produces simultaneous energization and deenergization of the above two elements of the structure and does not have the advantages now to be described.

Figure 3:
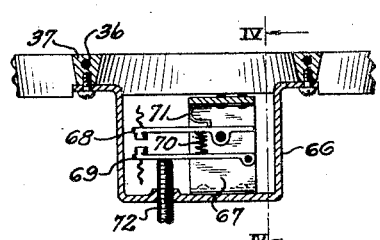
Fig. 3 is an enlarged scale horizontal sectional view of the fan motor control thermostat taken on the plane III—III of Fig. 1.
Figure 4:
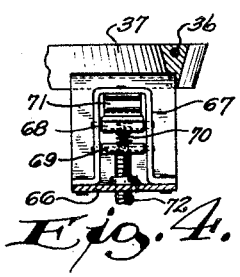
Fig. 4 is a vertical sectional view taken on the line IV—IV of Fig. 3.

Such second thermostat (see Figs. 3 and 4) includes a substantially U-shaped bracket 66 preferably mounted on the two adjacent inner portions of the heating element and on which is mounted a U-shaped yoke 67 bearing pivoted contact levers 68 and 69. A spring 70 acts between the contact ends and the pivot points of the levers, the lever 68 being under the action of a bi-metal 71 and the lever 69 being held in relatively fixed position by a screw 72 through the bracket 66. In practice the screw 72 is adjusted and locked at the factory to position the thermostat lever 69 so that the contacts of the thermostat 68, 69 will close at a temperature of approximately 150° F. whereby the circuit of the motor 42 is closed only when the heating element comes to that temperature and is opened only when the heating element again drops to that temperature. It will be seen that the actions of the two thermostats are entirely independent and without direct effect on each other.

The various conductors (shown diagrammatically and only in Fig. 9) to the second thermostatic means 67—72 are preferably shielded from the heating element 36—37 by a conduit 73 leading from the interior of the base to such thermostat. The conductors to the heating element are also preferably taken through such conduit and are brought out through the conduit by way of a notch 74 adjacent the terminals of the heating element. The conductors from the electric supply to the heater generally, to the motor and to the first thermostat (all of which conductors are shown only diagrammatically) are lead through grommeted openings 77, 78 and 79 into and in the heater, respectively.

In the modification shown in Figs. 5 to 8, inclusive, the base is formed by a footed plate 82 with an extension 83 therefrom of any suitable size and shape to raise the heating element a safe distance above any floor covering. The outer and inner casing portions are now formed as an integral unit with the outer casing portion 84 and the inner casing portion 85 also in substantially cylindrical form, and extending substantially concentrically, and with the side walls and one of the ends spaced from each other. Similar flanged plates 86 and 87 (see Fig. 8) are now employed to close the casings at one of their ends, such plates having similar openings therethrough as above described with reference to plate 32 employed in the first embodiment of the invention. The screen 38 is now held in place by an angle ring 88 fitted into the front opening of the inner casing.

In the present construction the aspirating tube is shown at 90 as extending upwardly through the two casings and is provided with an enclosure 91 at the upper end thereof for receiving the first thermostatic means 53—60 controlling the heating element, as described above. Air enters the enclosure 91 by way of a louvered rear plate 92 for the enclosure. The front plate 93 of the enclosure bears the scale 60 coacting with the knob 59 for adjusting the thermostat as above described. A suitable handle 94 is fixed on the enclosure which, together with the tube 90, has sufficient strength and rigidity to permit transportation of the entire device. Other than as above stated, the structures of the various elements of the second embodiment are precisely the same as those above described in connection with the first embodiment of the invention.

In operation, assuming that the heating element thermostat has been set to close at a temperature higher than the then room temperature, connection of the device by way of the conductors 96 (see Fig. 9) with a suitable source of electric current will immediately energize the resistor 36. When the heating element reaches a given temperature, the motor thermostat will close the circuit of the motor 42 and commence operation of the fan. The fan 51 then draws air through the openings in the several back plates thereby keeping the motor cool and forces the air out through the heating element and the screen. The fan also draws air from the room over the bi-metallic element of the first thermostat and through the aspirating tube, thus making the operation of such thermostat dependent on the room temperature only. As soon as the heating element temperature rises above the predetermined setting for the second thermostat, the bi-metal 71 expands and closes the circuit of the fan motor and such condition continues as long as the heating element temperature is maintained. Interrupting the circuit to the heating element has no effect whatever on the operation of the fan motor which continues until the heating element cools below the predetermined thermostatic setting. The motor thermostat accordingly lags behind both the energization and deenergization of the heating element. If the heater and motor circuits are both interrupted, of course, both the supply of the heat and the circulation of air stop. Hence the fan motor cannot then continue to supply the air and to affect the residual heat in the heating element. Unless the circuits are voluntarily interrupted, the heating element will remain energized until the room temperature reaches the setting of the first thermostat and the motor will remain energized due to continued closure of the second thermostat, until the heating element has been cooled down to the given temperature.

Although but two embodiments of the present invention have been illustrated and described, it will be apparent to those skilled in the art that various changes and modifications may be made therein without departing from the spirit of the invention or from the scope of the appended claims.

I claim:

1. In an electric heater of the fan type, a casing a heating element in the casing, a motor mounted on the casing, a fan mounted on the motor shaft within the casing for drawing air into the casing and forcing the air through the heating element, and a thermostat located on the casing and controlling the circuit of the heating element, the casing having a wall with an opening thereto for separating the heating element and the fan from the thermostat whereby a substantial portion of air drawn through the heater flows into the casing over the thermostat and through the casing wall opening before contact with the heating element.

2. In an electric heater of the fan type, a casing having an opening therethrough, a heating element in the casing, a motor mounted on the casing, a fan mounted on the motor shaft within the casing for drawing air through the opening into the casing and forcing the air through the heating element, and a thermostat controlling the circuit of the heating element, the casing having an apertured wall for separating the heating element and the fan from the thermostat the thermostat being mounted in the casing in the flow of air through the openings.

3. In an electric heater of the fan type, a casing having a plurality of portions in spaced relation, a heating element mounted in the casing, a motor mounted in the casing, a fan driven by the motor and drawing the air into the space between the casing portions and forcing the air through the heating element, and a thermostat located in the casing and controlling the circuit of the heating element, the casing having an apertured wall for separating the heating element and the fan from the thermostat, the thermostat being below and spaced from the heating element and in the flow of air drawn into the casing between the casing portions and being responsive only to the temperature of the air drawn thereover.

4. In an electric heater of the fan type, a casing having a plurality of casing portions in spaced relation, a heating element mounted in one of the casing portions, a motor mounted in another casing portion, a fan driven by the motor for drawing air into the casings and forcing the air through the heating element, a tube extending through the space between the casing portions and having one opening adjacent the fan, and a thermostat adjacent the other end of the tube and controlling the circuit of the heating element, actuation of the thermostat being controlled by flow of the air drawn through the tube by the fan and passing over and through the thermostat.

5. In an electric heater of the fan type, a casing having a plurality of casing portions in spaced relation, a heating element mounted in one of the casing portions, a motor mounted in another casing portion, a fan driven by the motor for drawing air into the casings and forcing the air through the heating element, a tube extending through the space between the casing portions and having one opening adjacent the fan, and a thermostat mounted outside of the casing adjacent the other end of the tube and controlling the circuit of the heating element, actuation of the thermostat being controlled by flow of the air drawn through the tube by the fan and passing over and through the thermostat.

6. In an electric heater of the fan type, an outer casing, an inner casing spaced from the outer casing, a heating element mounted in the inner casing, a motor mounted between the casings, a fan adjacent the heating element and driven by the motor for drawing air into the casings and forcing the air through the heating element, a tube extending through the casings and having one opening adjacent the fan, and a thermostat outside of the casings adjacent the other end of the tube and in the flow of air drawn therethrough for controlling the circuit of the heating element.

7. In a portable electric heater of the fan type, an outer casing, an inner casing spaced from the outer casing, a heating element mounted in the inner casing, the casings being provided with apertures remote from the heating element, a motor mounted between the apertured portion of the casings, a fan adjacent the heating element and driven by the motor for drawing air through the casing apertures and forcing the air through the heating element, a tube extending through the casings and having one opening adjacent the fan, and a thermostat outside of the casings and adjacent the other end of the tube for controlling the circuit of the heating element, actuation of the thermostat being responsive only to the temperature of the air drawn through the tube by the fan.

8. In an electric heater of the fan type, an outer casing, an inner casing spaced from the outer casing, a heating element mounted in the inner casing, the casings being provided with apertures remote from the heating element, a motor mounted between the apertured portion of the casings, a fan adjacent the heating element and driven by the motor for drawing air through the casing apertures and forcing the air through the heating element, a tube extending through the casings and having one end opening adjacent the ends of the fan blades for aspiration of air therethrough by the fan, and a thermostat outside of the casings and adjacent the other end of the tube for controlling the heating element circuit, actuation of the thermostat being controlled by the air aspirated through the tube from about the thermostat.

9. In a portable electric heater of the fan type, an outer casing, an inner casing spaced from the outer casing, a heating element mounted in the inner casing, the casings being provided with sets of apertures remote from the heating element, a motor mounted between the apertured portion of the casings, a fan adjacent the heating element and driven by the motor for drawing air through the casing apertures and forcing the air through the heating element, a tube extending through the casings and having one end opening adjacent the fan, and a thermostat variable at will from externally of the casings for controlling the circuit of the heating element, the thermostat being mounted outside of the casing and adjacent one opening of the tube for actuation responsive to the temperature of the air drawn through the tube by the fan from about the thermostat.

10. In an electric heater of the fan type, a casing, a heating element in the casing, a motor mounted on the casing, a fan mounted on the motor shaft within the casing for drawing air into the casing and forcing the air through the heating element, and a thermostat mounted on and responsive to the temperature of the heating element for controlling operation of the motor.

11. In an electric heater of the fan type, a casing, a heating element in the casing, a motor mounted on the casing, a fan mounted on the motor shaft within the casing for drawing air into the casing and forcing the air through the heating element, and a thermostat mounted on the heating element and between the heating element and the fan for closing the motor circuit after the heating element has reached a given temperature and opening the motor circuit after the heating element temperature drops below the given value.

12. In an electric heater of the fan type, a casing, a heating element in the casing, a motor mounted on the casing, a fan mounted on the motor shaft within the casing for drawing air into the casing and forcing the air through the heating element, a thermostat located in the path of air flow into the casing to the fan and controlling the circuit of the heating element, the thermostat being so located relative to the heating element as to be substantially unaffected by the operation thereof, and a thermostat independent of the first said thermostat and mounted on the heating element for controlling operation of the fan motor.

13. In an electric heater of the fan type, a plurality of casings in spaced relation, a heating element mounted in the casings, a first thermostat controlling the electric circuit of the heating element, a fan drawing air into the casings and forcing the air through the heating element, a motor mounted in the casings for driving the fan, the first thermostat being directly associated with the casing and spaced from the heating element and in the flow of air drawn into the casing for response only to the temperature of the air, and a second thermostat mounted on the heating element for controlling the electric circuit of the motor and responsive only to the temperature of the heating element.

14. In an electric heater of the fan type, a plurality of casings in spaced relation, a heating element mounted in the casings, a first thermostat mounted in the casing and controlling the electric circuit of the heating element, a fan drawing air into the casings and forcing the air through the heating element, a motor mounted in the casings for driving the fan, the first thermostat being spaced from the heating element and located in the flow of air drawn into the casings, and a second thermostat controlling the electric circuit of the motor, the second thermostat being mounted on the heating element and extending between the heating element and the fan for closing the motor circuit only after the heating element has reached a given temperature and opening the motor circuit only after the heating element cools below the given temperature.

15. In a portable electric heater of the fan type, an outer casing, an inner casing spaced from the outer casing, a heating element mounted in the inner casing, the casings being provided with apertures remote from the heating element, a motor mounted between the apertured portion of the casings, a fan adjacent the heating element and driven by the motor for drawing air through the casing apertures and forcing the air through the heating element, a tube extending through the casings and having one end opening adjacent the ends of the fan blades, an adjustable thermostat outside of the casings and adjacent the other end of the tube for controlling the heating element circuit, actuation of the thermostat being controlled by the flow of air drawn over the thermostat and through the tube by the fan, and a second thermostat adjusted for operation at a predetermined value and controlling the motor circuit, the second thermostat operating responsive to the temperature of the heat element and independently of the first thermostat.

ALFRED WILD.

REFERENCES CITED

The following references are of record in the file of this patent:

UNITED STATES PATENTS

| Number | Name | Date |
| --- | --- | --- |
| 1,678,059 | D'Ardenne | July 24, 1928 |
| 1,788,515 | Gannon | Jan. 13, 1931 |
| 1,958,007 | MacDougall | May 8, 1934 |
| 1,991,280 | Hynes | Feb. 12, 1935 |
| 2,078,548 | Strawser | Apr. 27, 1937 |
| 2,087,214 | Parsons | July 13, 1937 |
| 2,203,425 | Welch | June 4, 1940 |
| 2,303,447 | Fay et al. | Dec. 1, 1942 |
| 2,360,071 | Noll | Oct. 10, 1944 |